United States Patent
Cromer et al.

(10) Patent No.: US 7,117,013 B2
(45) Date of Patent: *Oct. 3, 2006

(54) CRUABLE DUAL MODE ISM AND U-NII WIRELESS RADIO WITH SECURE, INTEGRAL ANTENNA CONNECTION

(75) Inventors: Daryl Carvis Cromer, Apex, NC (US); Kazuo Fujii, Kanagawa (JP); Ronald John Griffiths, Jr., Raleigh, NC (US); Masaharu Itoh, Yamato (JP); Philip John Jakes, Durham, NC (US); Kozo Matsunaga, Kanagawa (JP); Masaki Oie, Machida (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 332 days.

This patent is subject to a terminal disclaimer.

(21) Appl. No.: 10/680,974

(22) Filed: Oct. 7, 2003

(65) Prior Publication Data

US 2005/0075135 A1   Apr. 7, 2005

(51) Int. Cl.
*H04B 1/38* (2006.01)
(52) U.S. Cl. ............ 455/558; 455/552.1; 455/557
(58) Field of Classification Search .......... 455/90, 455/557, 450, 562.1, 323, 558, 552.1; 343/702; 380/270; 710/240; 713/202, 200; 726/21
See application file for complete search history.

(56) References Cited

U.S. PATENT DOCUMENTS

| | | | |
|---|---|---|---|
| 6,173,405 B1* | 1/2001 | Nagel ................ | 726/21 |
| 6,404,393 B1 | 6/2002 | Nelson et al. | |
| 6,509,877 B1 | 1/2003 | Masaki | |
| 6,531,985 B1* | 3/2003 | Jones et al. ............ | 343/702 |
| 6,545,643 B1* | 4/2003 | Sward et al. .......... | 343/702 |
| 6,778,844 B1* | 8/2004 | Hood, III ............ | 455/562.1 |
| 2001/0006902 A1 | 7/2001 | Ito | |
| 2002/0087877 A1* | 7/2002 | Grawrock ............ | 713/200 |
| 2002/0137472 A1* | 9/2002 | Quinn et al. ......... | 455/90 |
| 2002/0164963 A1 | 11/2002 | Tehrani et al. | |
| 2002/0176366 A1 | 11/2002 | Ayyagari et al. | |
| 2002/0183013 A1 | 12/2002 | Auckland et al. | |
| 2003/0022652 A1* | 1/2003 | Stepp et al. ........... | 455/323 |
| 2003/0043078 A1 | 3/2003 | Deng et al. | |
| 2003/0050032 A1 | 3/2003 | Masaki | |
| 2003/0070098 A1* | 4/2003 | Tokita ................ | 713/202 |
| 2003/0202662 A1* | 10/2003 | McBrearty et al. ...... | 380/270 |
| 2004/0053622 A1* | 3/2004 | Nakakita et al. ........ | 455/450 |
| 2004/0204079 A1* | 10/2004 | Hamdi ............... | 455/557 |
| 2004/0225786 A1* | 11/2004 | Puupponen et al. ..... | 710/240 |

FOREIGN PATENT DOCUMENTS

| | | |
|---|---|---|
| EP | 1 083 622 A2 | 3/2001 |
| EP | 1 294 048 A2 | 3/2003 |

* cited by examiner

*Primary Examiner*—Eliseo Ramos-Feliciano
*Assistant Examiner*—Michael T. Vu
(74) *Attorney, Agent, or Firm*—Carlos Munoz-Bustamante; Dillon & Yudell LLP

(57) ABSTRACT

A method that utilizes both software and combination software and hardware mechanisms to comply with the FCC requirement for an U-NII antenna to be an integral part of the device, while providing CRUable dual mode wireless cards and wireless-ready U-NII devices. Enhancements are made to the system BIOS and Device Driver, and two new software-implemented utilities are provided to create authentication schemes that verify and authenticates the CRUable dual mode U-NII radio and antenna combination as being an FCC approved unique coupling during operation of the system. The system boots with only ISM transmission capability and is allowed to complete a U-NII transmission request only with an approved U-NII radio-antenna combination.

31 Claims, 8 Drawing Sheets

CRUABLE DUAL MODE ISM AND U-NII WIRELESS RADIO WITH SECURE, INTEGRAL ANTENNA CONNECTION

RELATED APPLICATIONS

The present invention is related to the subject matter of the following commonly assigned, co-pending U.S. patent applications: Ser. No. 10/681,006 entitled "CRUABLE U-NII WIRELESS RADIO WITH SECURE, INTEGRAL ANTENNA CONNECTION VIA SM BIOS IN U-NII WIRELESS READY DEVICE"; and Ser. No. 10/680,974 entitled "CRUABLE DUAL MODE U-NII WIRELESS RADIO WITH SECURE, INTEGRAL ANTENNA CONNECTION IN U-NII WIRELESS READY DEVICE". The content of the above-referenced applications is incorporated herein by reference.

BACKGROUND OF THE INVENTION

1. Technical Field

The present invention relates generally to wireless communication devices and in particular to wireless communication devices utilized in computer systems. Still more particularly, the present invention relates to customer installable and replaceable dual mode wireless cards utilized in computer systems.

2. Description of the Related Art

Implementation of computer-based wireless communication devices, including wireless LANs and wireless ready systems is a quickly emerging and evolving technology. Conventional computer-based wireless communication devices transmit radio frequency (RF) signals to wireless receivers of local area networks (LANs). These devices include transmitters that both transmit and receive wireless communication within a particular bandwidth in the highly regulated RF spectrum.

The RF spectrum is a limited bandwidth spectrum that is allocated among a number of different services types/applications, including military, aviation, broadcast, and commercial communications. Because of the very limited bandwidth available within the radio frequency (RF) spectrum, transmission in this medium is subject to strict government regulations. The regulations typically cover to the type and parameters of the transmitters being utilized in a wireless network. These regulations cover modulation scheme, frequency of operation, and transmit power of the transmitters in order to avoid interference among the various authorized services utilizing the RF spectrum.

Transmitters comprise a combination of a circuit module called a radio coupled to an antenna. The antenna is a central part of the transmitter since the antenna is designed and tuned to optimize gain or attenuation for desired frequencies. Conventionally, manufacturers of transmitters obtain a license from the government authorizing the manufacturer to manufacture a particular type of transmitter, exhibiting particular parameters. The license covers both components of the transmitter unit (i.e., radio and antenna), and the license typically specifies exact protocols (i.e., operating parameters or ranges of parameters) for both components and the combination device. In the United States, for example, licenses are granted and regulated by the Federal Communication Commission (FCC). Also, the regulations require that the end users not be able to change or reconfigure the transmitter, which would result in operation outside of the authorized parameters. Any change made to the operating parameters radio or antenna requires another application for license and authorization by the FCC.

Conventional wireless computer networks are provided two frequency ranges with defined protocols to support wireless operations. These protocols are the 802.11b and 802.11g protocols, operating at ISM band for 2.4 GHz, and the U-NII HiperLAN/2 and other protocols, operating at U-NII for 5 GHz. With the strict government regulations, it is essential that manufacturers and users of Wireless Fidelity (WiFi) LAN components ensure that the wireless component is operating within authorized parameters (i.e., power, roll off, etc. as defined by specification) provided by the ISM band for 2.4 GHz and U-NII for 5 GHz ranges. It is also essential for the components to be designed to prevent tampering or modification by the end users, which would change the operating parameters of the transmitter.

To obtain authorization for the transmitter, manufacturers implement design and manufacturing controls to ensure that the transmitter complies with the regulatory requirements. For example, the regulation of transmitters operating with the ISM 2.4 GHz band requires a unique connection between the radio and antenna. To satisfy this requirement, the manufacturers designed a unique connector. International Business Machines Corporation, for example, selected a reverse thread connection for its low profile peripheral component interconnect (PCI) Card. That company also implemented a method referred to as BIOS Lock, which is described below to ensure compliance with the FCC's ISM 2.4 GHz band regulations.

Maintaining tight coupling between the radio and antenna in desktop personal computer or with PCMCIA cards is straightforward, since transmitters (radio and antenna) are typically packaged as a single unit within the casing of the card. However, maintaining tight coupling for devices imbedded in notebook-type computer systems is much more complicated because the antenna is integrated into the lid portion or cover (i.e., within the external plastic or composite shell covering the top portion) of the portable computer system, while the radio is typically a mPCI (mini peripheral component interconnect) card inserted into the lower portion (i.e., the base/chassis) of the portable computer system. In the portable computer environment, the transmitter is assembled by inserting the wireless PCI card into an mPCI slot and coupling the radio to the antenna via a coax cable. The antenna is embedded in the lid portion of the computer.

Since there are a variety of suppliers of 802.11b mPCI (ISM 2.4 GHz band) cards available on the market, the manufacturers of the notebook computer systems have to implement ways to ensure that the FCC regulations are complied with. That is, the manufacturer must design the computer system with a built in mechanism to prevent unauthorized 802.11b cards from being utilized with the antenna built in to the computer system's cover. Different manufacturers provide different methods of handling this potential problem. IBM, for example, currently implements a method referred to as BIOS (basic input/output system) Lock, which is described below.

Conventional 802.11b mPCI cards are inserted into the computer system before the computer system is powered on, and as such, BIOS Lock occurs during boot-up of the computer system. During boot, power-on self-test (POST) checks the PCI IDs of the mPCI card and compares the PCI IDs to authorized cards for that computer system. If the BIOS detects an unauthorized card, the BIOS will prevent boot of the system. This method allows the manufacturer to enable a system to accept several different 802.11b WiFi cards from different suppliers. This approach also enables wireless-ready systems, where the computer system is shipped with the antenna embedded in the cover and the end user is able to install one of the authorized 802.11b WiFi mPCI radio cards.

Unlike the FCC regulation of its 802.11b (ISM 2.4 GHz band) counterpart, the FCC's regulation of transmitters operating with the 802.11a (U-NII/5 GHz band) protocol requires that: "Any U-NII device that operates in the 5.15–5.25 GHz band shall use a transmitting antenna that is an integral part of the device." (FCC regulation, Part 15.407d). This restrictive requirement presents a challenge for integrating U-NII wireless LAN (WLAN) devices such as an U-NII wireless card in a mobile PC, which is designed with an antenna subsystem separate from the feature card implementing specific WLAN function. The BIOS Lock method for 802.11b (ISM 2.4 GHz band) is not stringent enough and does not meet this FCC standard of "integral part of the device."

Conventional methods provided as solutions to the "integral part of the device" requirements either (1) solder (or otherwise permanently attach) antenna leads to the WLAN feature card, or (2) permanently "bury" the feature card inside the mobile PC behind tamper-proof screws or other such mechanisms. Both approaches are not ideal because of serviceability issues, manufacturability issues, and additional costs. More importantly, the permanence of the placement of the card eliminates the ability to provide U-NII-based cards as an after-market upgrade that is customer installable, as is currently possible with 802.11b cards. The Tamper roof Screw, introduced by IBM is one hardware implementation that has received approval by the FCC for U-NII-based machines.

The PC industry has a long tradition of providing flexibility and expandability. Manufacturers, such as IBM, are extending this tradition to the wireless arena, and are now building substantially all laptops with integrated antennas. With the 802.11b (ISM 2.4 GHz standard, for example, the user can order a card at time of purchase, add wireless, or change wireless cards in the future. This functionality, particularly the adding and/or replacing of the wireless card after purchasing the computer system, has led to the generation of customer replaceable unit (CRUable) wireless devices in the 802.11b arena.

Currently, the 802.11b radio is widely deployed in corporate enterprises and in public hot spots, such as hotels, airports, etc. Recently, manufacturers have deployed the higher performance U-NII (U-NII) radio in corporate infrastructures where additional performance and capacity is critical. The difference in functional characteristics and cost of the two radios (i.e., the transmitter types) results in a different market (and/or user) for computer systems designed to support one of the two types of radio. Naturally, because of the above described regulations, computer systems supporting the U-NII (U-NII 5 GHz) standard requires the U-NII radio be built in to and shipped/sold with the computer system, while the radios for computers supporting the 802.11b standard may often be provided after-market, as a separate user-replaceable component.

Because of the differences in users, operating parameters/restrictions, and customer demands, manufacturers conventionally manufacture single-mode wireless 802.11b cards with a radio or a combo card that contains both an ISM 802.11b radio and separate U-NII radio. The combo (U-NII/802.11a & ISM/802.11b) cards are installed in the computer systems connected to the antenna with tamper proof mechanisms in order to satisfy the FCC's "integral" requirement. U-NII/b combo cards or single function U-NII radios are not sold as a separate after-market product.

With more and more notebook users desiring the functionality of both systems as the users travel between work (which may support U-NII transmission) and other areas, including home, which typically support only ISM transmission, manufacturers have provided wireless combo cards that support both ISM and U-NII communication/transmissions. Of course, the combination ISM and U-NII products must meet the regulatory rules for both ISM and U-NII devices and thus these combination products are also pre-installed in the system to comply with the FCC's integral requirement and are not available as separate after-market products.

Conventional wireless chip architecture of combination cards has a common Device Driver, Firmware, Media Access Controller, BaseBand, single dual band antenna (i.e., one antenna capable of supporting both 802.11a and 802.11b transmission), but two radio modules (e.g., an ISM 2.4 GHz radio and a U-NII 5 Ghz radio). With these cards, the Wireless LAN can be dynamically switched between the 802.11b and 802.11a radio, with only one radio capable of being active at a time. Some existing systems thus allow a dynamic switching between types of networks, e,g, WLAN, WWAN, LAN, without user intervention. For example, U.S. Pat. No. 6,509,877 describes sharing of integrated WLAN dual antennas with diversity and a Bluetooth antenna in the panel with cabling to the radio in the base unit. The patent covers methods for switching the coupling of the radio to the antenna. Notably, however, the method does not provide a method to couple the antenna to the radio post-manufacture or prevent the radio from being used in an unauthorized or invalid system. Other systems provide multiple antennas and enable the selection of an antenna based on a dynamic measurement of the quality or strength of the signals. With both types of systems, multiple antennas and, in some instances, multiple radios are provided to support the switching between communication media or networks. However, even these systems are restricted from operating in the U-NII protocol without fulfilling the FCCs integral requirement for the radio and antenna combination. Thus, systems that support U-NII communication have radios built into the system and protected by some tamper proof mechanism. Providing CRUable radio devices for these systems is not an option.

The present invention recognizes the current limitations with implementing dual-mode U-NII-based wireless computer systems, as well as the limitation of not enabling after-market upgrades of cards. The invention further recognizes that it would be desirable to provide authentication mechanisms that enable compliance with the "integral part of the device" requirement for the U-NII antenna connection, but still allows for serviceability and after-market replacement or addition. These and other benefits are provided by the invention described herein.

SUMMARY OF THE INVENTION

Disclosed is a method and system that utilizes software to meet the FCC requirement for a U-NII antenna to be an integral part of the device in which it operates, while providing wireless ready U-NII devices and dual mode Customer Replaceable Units (CRUable) ISM and U-NII radio modules. Two implementations are provided, one utilizing a Client Manager utility and the other utilizing a Validation Utility with a password registry.

The device comprises the antenna, an interface slot, a coax radio connector slot and coax coupling the inserted radio via the connector slot to the antenna, and a basic input/output system (BIOS). In the first implementation, the device's BIOS is enhanced to include a table of authorized/approved radio-antenna pairs for the device. Additionally, the device executes a Client Manager utility, which is programmed with a transmission mode selection function that includes specific U-NII authentication processing code. In the second implementation, the device includes a device driver and a Validation Utility that provides a authentication checking process for triggering the device driver to support U-NII transmission functions of the wireless card. The CRUable ISM and U-NII radios are fabricated on a wireless module that also comprises an interface for connecting to the interface slot of the device, as well as an EEPROM with a register storing identification information or means for identifying the radio-type to the device. The information stored in the EEPROM is imprinted in the EEPROM's register during manufacture of the module.

The software-based authentication process is completed as a radio-to-device authentication process. ISM transmission is provided as the default transmission mode of the device after the device is powered on. The boot process is allowed to proceed but only the ISM radio is enabled. The U-NII radio is disabled from operating within the device, so that the device boots without U-NII transmitter functions installed. During boot up of the device or during subsequent request for U-NII transmission, the identifying information of the radio is passed to the facility that is completing the authentication of the U-NII radio-antenna pair. The information is linked with similar identifying information of the antenna (provided during manufacture) and the pair of PCI IDs is compared to the list of authorized combinations stored in the device. In the second implementation, a security key is provided to enable access to the table of authorized pairs. U-NII transmission capability of the device and radio is enabled only when the pair of PCI IDs match one of the combinations within the approved/authorized list, indicating FCC approved device-antenna-radio combination under the "integral" requirement.

In one embodiment, the boot process is allowed to continue only when the U-NII radio passes the authentication process. Otherwise the boot process is terminated. The invention thus allows the manufacture of both wireless-ready U-NII computer systems and approved CRUable U-NII radios by uncoupling the radio and antenna, while ensuring that the combination of system-antenna-radio would meet the FCC integral standards for antennas and transmitters operating with that protocol.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

Figure 1A:
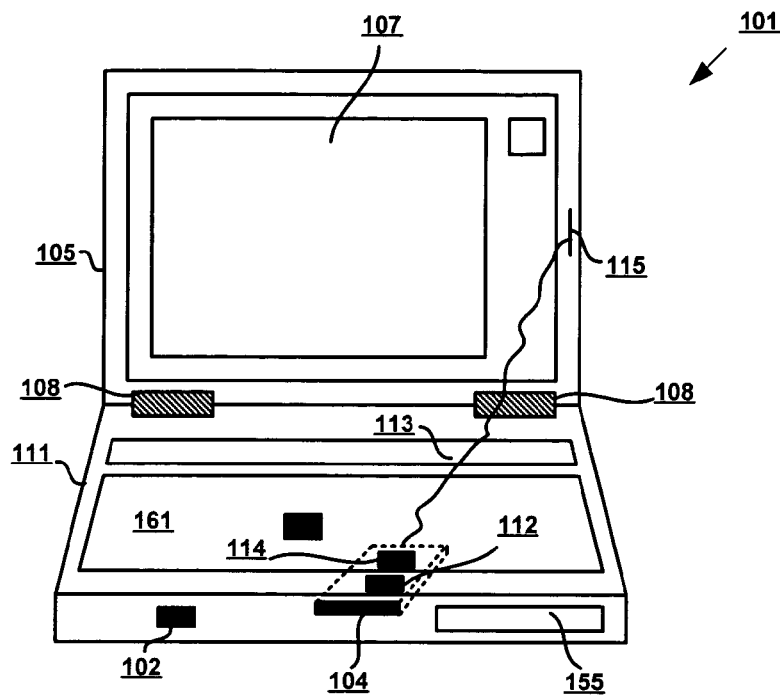
FIG. 1A is a block diagram generally illustrating the base and display portions of an exemplary dual-mode, wireless laptop computer system within which the features of the invention may be implemented.

The present invention provides a software-implemented authentication procedure that enables a computer system designed with an embedded U-NII-standard antenna to accommodate a CRUable dual mode wireless card while fulfilling the FCC's "integral" requirements. The invention satisfies the integral requirement for devices of U-NII wireless transmitters utilizing two different authentication processes implemented respectively by software code and hardware interacting with system software, specifically the system BIOS. The combination of software and/or hardware interacting with programmed functionality of the system BIOS enables post-boot up authentication of the U-NII antenna-radio (transmitter) pair to ensure unique, FCC-approved coupling of system-antenna-radio before allowing the U-NII radio to be operational within the system. In addition to the other software and hardware components, the BIOS is uniquely coded for the particular chassis and antenna of the system/device within which it is located. The software only solution of the first implementation is important because the solution can be utilized with existing hardware and is easily implemented on any wireless offering made by the manufacturer.

The unique coupling via software allows the radio to be sold separately and later installed into the computer system having a correct antenna, while still meeting the regulatory requirements for unique coupling. The invention thus provides a CRUable dual mode wireless card for both ISM and U-NII operation that is authenticated via a software-directed scheme for U-NII operation either during the boot process or after boot-up in ISM-only mode. The CRUable card is provided with an EEPROM that is imprinted with code and/or information that provides the identifying information of the U-NII radio, which is imprinted in the EEPROM by the manufacturer. The identifying information is utilized to complete the authentication process that ensures that only the unique coupling will enable U-NII transmission capabilities within the system. The functional use of identifying information is described in further detail below in the description of FIGS. 3A, 4 and 5B.

For purposes of the invention, the term "dual mode" refers to operation/transmission via both the ISM and U-NII standards. However, the invention focuses primarily on enabling U-NII operation with a card that is designed with both an ISM and a U-NII radio. The dual mode card is inserted into a device/system that also supports operation/transmission in both modes; however, the invention provides several built in checks to prevent U-NII operation without complying with the FCC's integral standard for U-NII devices. Also, the invention is described generally with reference to ISM and U-NII devices/radios; however, for illustrative purposes, several references are made to an 802.11b ISM 2 GHz device/radio and an 802.11a U-NII 5 GHz radio/device.

In the description below, the software-implemented scheme involves two different implementations that complete the authentication for dual mode wireless cards after the wireless card is installed in the computer system. The actual authentication of the U-NII radio and antenna combination occurs either during or after boot-up of the system, and both implementations are described below.

In the described embodiments, the software-implemented portions of the invention involves interaction with the system BIOS, which is linked to the antenna and also to the module. In the various described embodiments, which implement either the software-directed authentication scheme or the combination hardware-software-directed authentication scheme, the computer system designed (with embedded antenna) is prevented from completing U-NII transmission after being powered up until an absolute validation/authenticated of the radio and antenna combination is verified. Once the combination is verified, the system is enabled to operate with both the ISM and U-NII wireless protocols and may switch from one to the other mode as desired.

Notably, as will become clear in the described embodiments, the various implementations of the invention are significantly different from BIOS Lock currently implemented for 802.11b (ISM 2.4 GHz) operation. The BIOS Lock prevents the system from booting up with un-approved radios, but does not prevent the radio from working in an un-approved system. For example, one is able to take an 802.11b radio and it installs the radio in another notebook without BIOS Lock, and the radio would be connected to the antenna in that chassis and fully functional. However, for U-NII (5 GHz) systems such as an 802.11a transmitter, this would probably create an unauthorized or illegal configuration under FCC regulations. The present invention overcomes this potential problem since the invention ensures both that the system will only accept approved radios and that the radio will only transmit in approved systems.

Since the radio is only functional when placed in a specific chassis that contains the correct antenna, the problems/concerns that led to the strict FCC integral regulation are eliminated, without having to hardwire the antenna and radio within the system during manufacture. The antenna and radio combination when coupled together and authenticated via the method provided by the present invention meets the FCC requirement for "integral part of the device" and is thus a legally approved combination. However, in the preferred implementation, the ISM 802.11b radio may be functional after system boot up even though the 802.11a radio is not functional without further authentication.

Figure 1B:
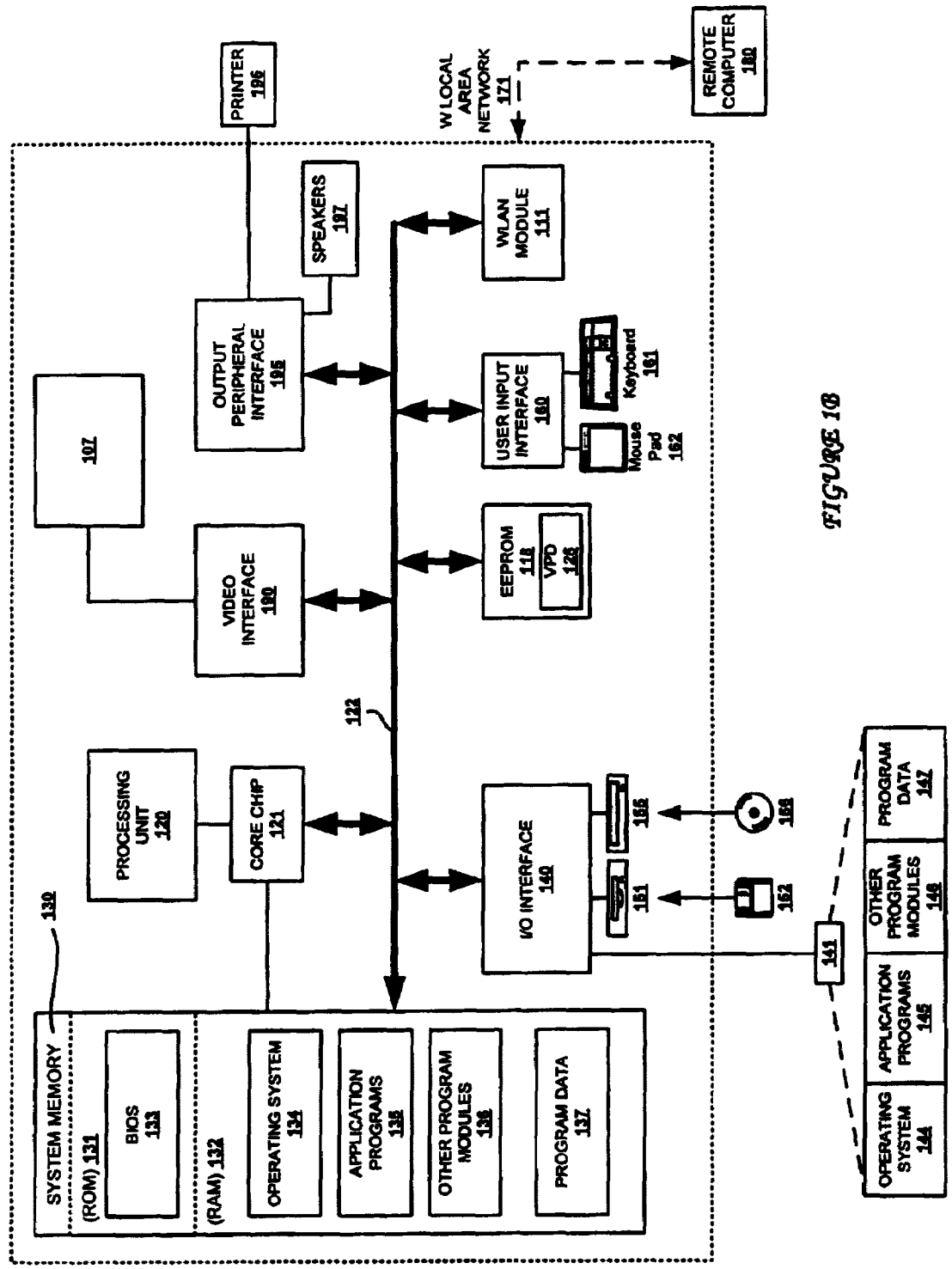
FIG. 1B is a block diagram depicting the internal components of the exemplary laptop computer of FIG. 1A, including some software components utilized in accordance with one embodiment of the invention.

Referring now to the figures, and in particular to FIGS. 1A and 1B, there are respectively illustrated an example of a wireless ready laptop computer and a computing system environment 100 within which the invention may be implemented. To simplify the description of the invention, the computing system environment is assumed to be an internal view of the laptop system described in FIG. 1A and thus share reference numerals. The laptop system and computing system environment are provided as an example and is not intended to suggest any limitation as to the scope of use or functionality of the invention. Neither should the computing environment be interpreted as having any dependency or requirement relating to any one or combination of components illustrated in the exemplary system environment.

Thus, the invention is operational with numerous other general purpose or special purpose computing system environments or configurations. Examples of well known computing systems, environments, and/or configurations that may be suitable for use with the invention include, but are not limited to, personal computers, server computers, handheld or laptop devices, multiprocessor systems, microprocessor-based systems, set top boxes, programmable consumer electronics, network PCs, minicomputers, mainframe computers, distributed computing environments that include any of the above systems or devices, and the like.

FIG. 1A illustrates an exemplary laptop computer system configured for wireless communication (also referred to as a wireless-ready laptop computer system). Laptop computer 100 comprises base unit (or chassis) 101 having internal components and an external housing with an upper surface, a lower surface, side walls, etc. The laptop computer 100 also comprises a lid portion or cover 105 that includes display unit 107. Lid portion 105 is attached to the base unit 101 via some form of hinge mechanism 108. In the illustrative embodiment, display unit includes a screen 107 and external housing. Lid portion 105 also comprises an embedded antenna 115 with attached co-ax cable 113 running from antenna 115 through the hinge 108 into the base unit 101. The antenna 115 is hidden/embedded behind the lid cover/shell and is thus referred to as an embedded antenna. Also, according to the invention, the antenna has a unique ID, which is known by the BIOS of the computer system. The antenna 115 may be designed to support both ISM 2.4 GHz band and U-NII 5 GHz band operations. However, only one mode of transmission (ISM or U-NII) can be enabled at a given time. In some systems, multiple antennas may be provided for diversity. For example, the system may comprise two antennae, one on the right side and one on the left side of the display unit, each capable of supporting both ISM and U-NII transmission.

Base unit 101 also comprises an on/off button 102 by which power to the internal components are turned on and off. Within the base unit 101 is a motherboard (not shown) on which the functional components of the laptop computer such as the processor, memory, etc., are built/installed. Also contained in the motherboard is an mPCI port (illustrated as dots 114), which accepts mPCI cards, such as U-NII wireless cards, 802.11b wireless cards, or U-NII/ISM (801.11a/b) wireless combo cards. Access to the mPCI port is obtained either by opening an access panel 104 (on the bottom of chassis unit 101) or by lifting keyboard 161. Although described with specific reference to mPCI cards and associated mPCI port, those skilled in the art would appreciate that the features of the present invention may be applicable to other types of port/connection schemes and CRUable cards.

Figure 2:
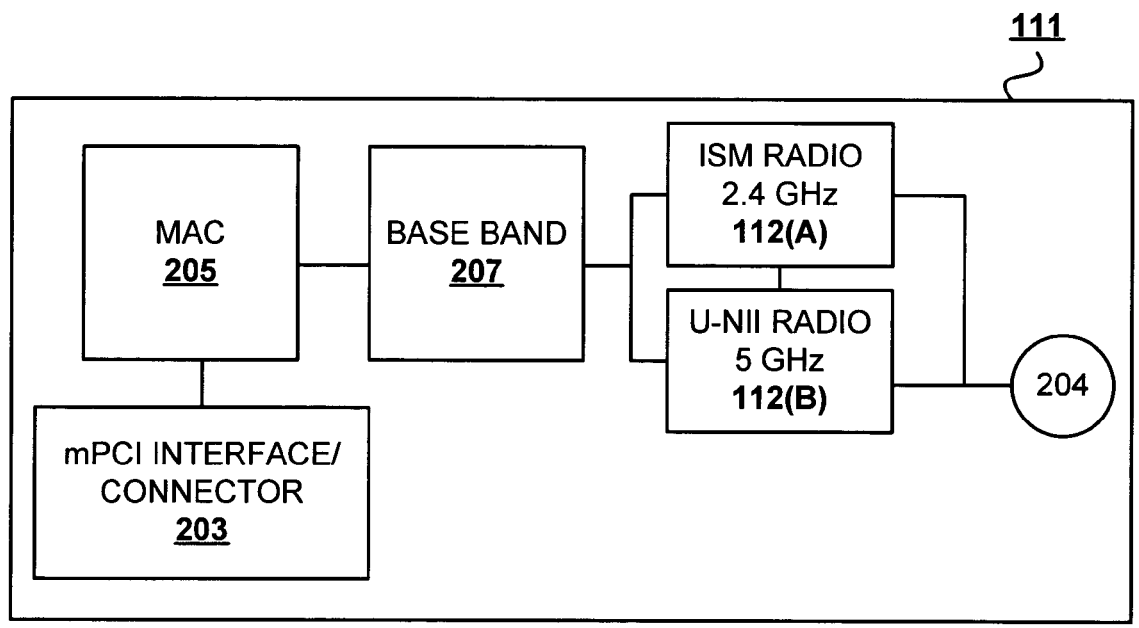
FIG. 2 depicts an exemplary CRUable wireless module with a both an ISM radio and a U-NII radio according to one implementation of the present invention.

As will be explained in greater details below, an access panel 104 enables an insertion of a wireless card/module 111, such as is shown in FIG. 2, into the mPCI port 114 located behind the access panel 104. The interfaces are electrical connectors that received interlocking connectors from the wireless card 111. Wireless card 111 has a connection interface for mPCI bus signal interface, which connects to mPCI port 114 on the motherboard. One electrical connector/interface 204 illustrated in FIG. 1A serves to electrically couple the radios 112A and 112B of the wireless card 111 to the antenna 115 using micro-coaxial cable 113.

Turning briefly to FIG. 2, dual mode wireless mPCI card 111 comprises wireless ISM (2 GHz) radio 112B and wireless U-NII (5 GHz) radio 112A (e.g., an 802.11a radio), a BaseBand 207, and a media access controller (MAC) 205. The wireless mPCI card 111 also contains an antenna interface 204 that provides a cable connector to the radios 112A and 112B for micro-coaxial cable 113 to complete external coupling and interaction with antenna 115. As described in FIG. 1A, antenna 115 may be integrated within the lid portion of the laptop 100 and connected via micro-coaxial cable 113 to the U-NII radio 112B and ISM radio 112A on mPCI card 111. mPCI card 111 also comprises an mPCI interface/connector 203 that interfaces with the processor and other components on the mother board via mPCI port 114. Other connectors provided on mPCI include power interface (not shown) for providing mPCI card 111 with electrical power when PCI card 111 is connected within laptop 100 via mPCI port 114. Wireless mPCI card 111 may also comprise a power divider and preamplifier, as well as other components, none of which are relevant to the invention and therefore not illustrated herein.

According to the illustrative embodiment, the lid portion 105 of FIG. 1A includes a single antenna 115, which supports both U-NII wireless and ISM wireless communication. Only one of the ISM or U-NII radios may be active at any given time. Alternate implementations may provide two antennas to allow for diversity selection of the best antenna based on signal quality performance. Also, CRUable wireless card 111 is illustrated with two radios, a U-NII 5 GHz radio 112B and an ISM 2.4 GHz radio 112A. The U-NII radio 112B and ISM 2.4 GHZ radio 112A are coupled to antenna 115 when wireless card is inserted into system port 104. Pairing of radios is completed by the manufacturer to ensure that the radio pairs are compatible for operation within particular computer systems having (one or more) antennas that each support the unique combination requirements of the U-NII transmitter as well as the more general requirements of the ISM transmitter.

With specific reference to FIG. 1B, there is illustrated an exemplary general purpose computing device, which for purposes of simplification is assumed to be wireless ready laptop computer 100. Computer 100 comprises, but is not limited to, a processing unit 120, which is connected by local bus to core chip 121. Core chip 121 is also connected to system memory 130, and a system bus 122. The system bus 122 may be any of several types of bus structures including a memory bus, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus.

The system memory 130 includes computer storage media in the form of volatile and/or nonvolatile memory such as read only memory (ROM) 131 and random access memory (RAM) 132. For purposes of the invention, computer 100 further comprises an EEPROM 118, connected to the system bus 122, and which contains Validation Register 125. A basic input/output system (BIOS) 133, containing the basic routines that help to transfer information between elements within computer 100, such as during boot-up, is typically stored in ROM 131. RAM 132 typically contains data and/or program modules that are immediately accessible to and/or presently being operated on by processing unit 120. By way of example, and not limitation, the program modules include operating system (OS) 134, application programs 135, other program modules 136, and program data 137.

The computer 100 may also include other removable/non-removable, volatile/nonvolatile computer storage media. By way of example only, FIG. 1B illustrates a hard disk drive 141, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

I/O Interface 140, connects hard disk drive 141, magnetic disk drive 151, and optical disk drive 155 to the system bus 122. The drives and their associated computer storage media discussed above and illustrated in FIG. 1B provide storage of computer readable instructions, data structures, program modules and other data for the computer 100. For example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies.

A user may enter commands and information into the computer 100 through input devices such as a keyboard 161 and an integrated pointing device 162 (e.g., a track point or track pad), commonly referred to as a touch pad. These and other input devices are integrated into chassis 101 and are often connected to the processing unit 120 through a user input interface 160 that is coupled to the system bus 122, but may be connected by other interface and bus structures, such as a parallel port, game port or a universal serial bus (USB). A LCD panel 107 (integrated into lid 105) is also connected to the system bus 122 via an interface, such as a video interface 190. In addition to the monitor, computers may also include other peripheral output devices such as speakers 197 and printer 196, which may be connected through an output peripheral interface 195.

The computer 100 may operate in a networked environment using logical connections to one or more remote computers, such as a remote computer 180. The remote computer 180 may be another personal computer, a server, a router, a network PC, a peer device or other common network node, and typically includes many or all of the elements described above relative to the computer 100. When used in a WLAN networking environment, the computer 100 is connected to the WLAN 171 through a WLAN network interface or wireless adapter 111. The connection to the networked computer 180 is facilitated by WLAN module 111, which connects via wireless transmission to other components in WLAN 171. WLAN module 111 connects to system bus 122 via an mPCI connector 114. Computer 100 may also be connected via wired LAN and/or the Internet via other connection modules such as a modem.

The invention operates within a communication device (e.g., the laptop computer system 100 of FIGS. 1A and 1B) with which FCC authorized radio-antenna coupling is required for U-NII communication. The computer system is provided to a user with an U-NII approved antenna embedded within the lid or other location that is made relatively inaccessible to the user or difficult to modify/replace without manufacturer authorized support. This prevents the antenna from being tampered with. Also, each embedded antenna has a unique ID, which identifies the antenna as an U-NII antenna that may be utilized to receive and issue wireless transmissions within the particular computer system. In one embodiment, the unique ID is stored within the BIOS. Finally, according to the invention, the particular device and antenna together provide specific identifying characteristics required by any combination of radio and antenna coupling that is to be utilized for wireless communication via the U-NII protocol.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Because most of the implementation of the invention occurs within portable computer systems, such as laptop computer system 100, the remainder of the invention will be described with specific reference to a computer system and software and hardware components thereof. As previously described, the antenna is imbedded in the system lid, which is permanently connected to the chassis, in which the mother board having the CPU and System BIOS, and mPCI slot for connecting the CRUable mPCI card is located. A permanent connection between the system lid, which contains the antenna, and the system chassis is made via the hinges. The mother board/system board has a permanent connection to the chassis and contains BIOS unique to that mother board/chassis/system and lid configuration. The permanent connections allow the combination of antenna, motherboard, and BIOS to be considered a single unit. The unique paring of a wireless card (such as card 111) to the motherboard allow for an integral connection that meets the FCC requirements, since the motherboard has a unique coupling to antenna.

During design and manufacture of the transmission antennas, an antenna identifier (ID) is created that is unique to the specific antenna subsystem and computer system within which the antenna is to be embedded. This antenna ID is based on the antenna's size, shape, material, tuning and the size, shape, material of the surrounding composite. Further, this unique antenna ID is a function of the antenna and chassis only and not related to previously used identifiers for machine type models (i.e., CPU, segment, Series, etc).

Cruable Dual Mode Wireless Radio Module and Secure, Integral Antenna Connection Via Software Mechanisms The invention provides a software-based mPCI radio-to-system/device authentication process. The invention comprises two different implementations to complete device-to-system authentication of dual mode wireless cards, i.e., cards that are designed with both an ISM and a U-NII radio. With both implementations, because it is possible to utilize the combination card for both ISM operation and U-NII operation, the computer system is allowed to boot up with ISM operation enabled, following the required checks for such systems. That is, rather than disabling the computer system or disabling the card as in the related applications (relevant features of which are hereby incorporated by reference), the system is allowed to boot up with a fully functional ISM transmitter (or radio) even if the U-NII radio cannot be authenticated later. The current embodiments/implementations thus provide specific solutions for combo-cards that allows for selectively enabling or disabling the U-NII radio without impacting the use of the ISM radio.

The implementations of the invention provides a combination hardware/software and a software-controlled method for selectively enabling or disabling an U-NII radio to meet the FCC's unique coupling (or integral) requirement without impacting the use of the ISM radio. The invention recognizes that, unlike the single radio implementations described in the related applications, incorporated by reference above, the implementation for dual mode preferably includes a post boot-up (or during operation) authorization checking process for the U-NII devices. This enables the system to boot-up for operation with the ISM radio, without forcing the generation of a U-NII invalid device error and shut down of the entire wireless device and/or card as in the previous implementations.

When the authorization check of the U-NII devices occurs during POST and returns a confirmation, the system allows the card to be activated. However, since only one standard/protocol can be utilized at a time, the system activates the ISM radio as the default and saves the positive result for the U-NII radio until a request is received to utilized that radio. A built in mechanism is required to enforce the exclusive operation of the U-NII radio with only its approved antenna pairing and thus ensure that the system never allows unauthorized (non-manufacture) approval of radio-antenna paring for U-NII operation.

The invention provides new software modules and enhancement of current modules, specifically the device drivers and system management BIOS, in order to complete the authentication steps for the dual mode CRUable cards. The BIOS is utilized to couple the radio and the antenna together, creating an integral device that meets the intent of the regulatory statues governing U-NII devices. Unlike other implementations, such as those described in the incorporated related applications, however, the authentication checks are primarily made post-boot-up and completed following the receipt of a request to complete an U-NII wireless communication/connection. The present implementation is uniquely different from those of the incorporated applications because the present implementations allow for dynamic determination of whether or not to enable an U-NII radio while the system is operating.

Certain types of wireless chip architecture, such as Calexico® manufactured by Intel, comprises a common Device Driver, Firmware, Media Access Controller, and BaseBand (i.e., the original band of frequencies of a signal before it is modulated for transmission at a higher frequency). Because of this, the Wireless LAN can be dynamically switched between ISM protocol operation and U-NII protocol operation and by definition between and ISM radio and a U-NII radio. The protocol implemented depends on which radio is currently active.

With the present implementations, the dynamic switching to an U-NII necessarily entails a series of checks to ensure that the correct radio/antenna pair is provided based on the FCC regulations. Since the authorization is completed post-boot-up, the wireless card is configured to default to only ISM mode when first activated. That is, heterogeneous roaming is initially disabled. Again, the antenna is imbedded in the chassis and has an antenna ID that is unique to the antenna subsystem. According to the described embodiment, the antenna ID is accessible through system software via SM BIOS call or the antenna ID is stored in a known location.

(1) Client Manager Implementation

Figure 3A:
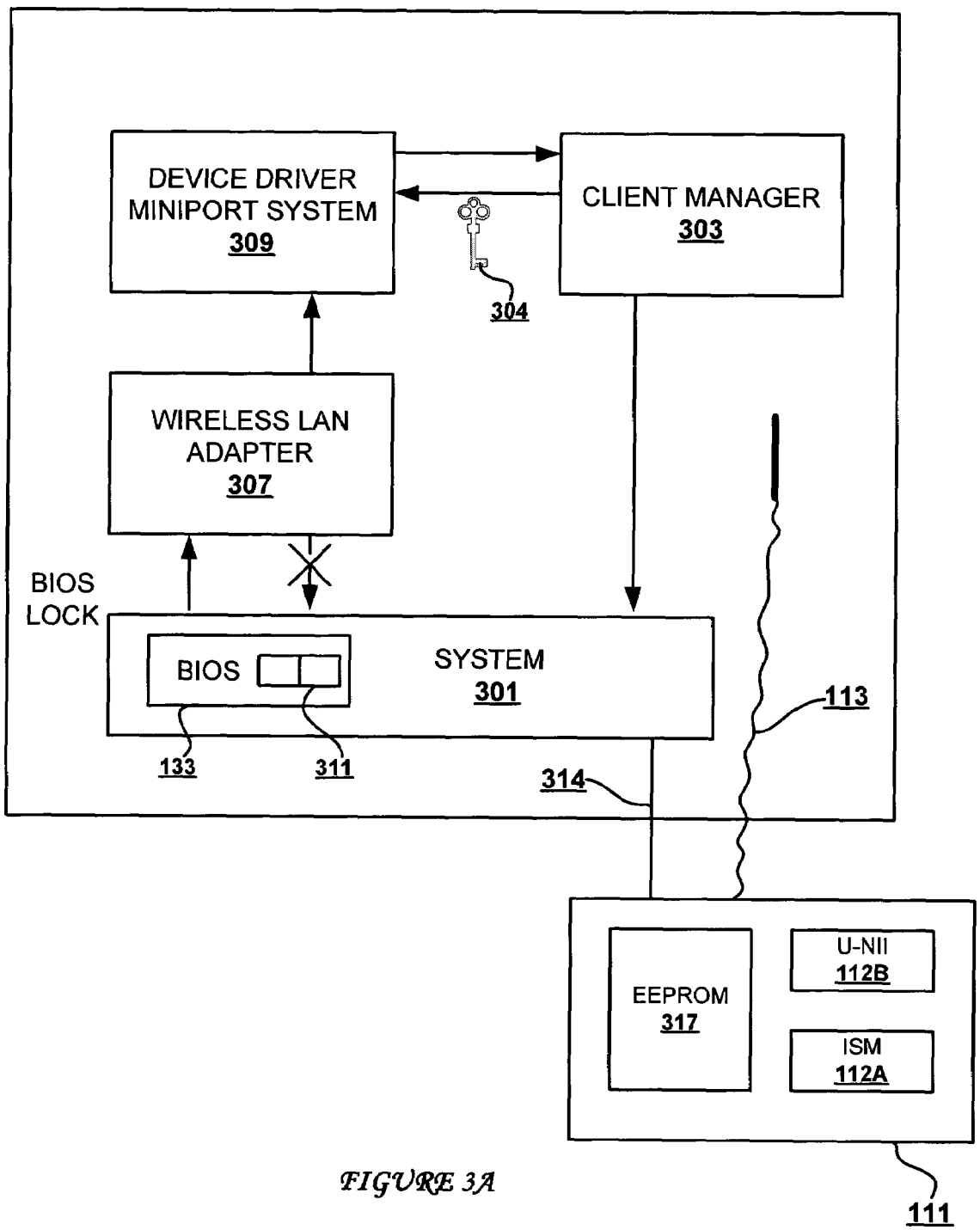
FIG. 3A depicts the components by which authentication of a U-NII radio within a dual mode wireless module is completed utilizing a Client Manager utility according to a first embodiment of the invention.

FIG. 3A illustrates several of the software and hardware components involved in completing the authentication process according to the first implementation. The major blocks within the figure include blocks within the motherboard 301 of computer system 100 and a wireless module 111, shown separated by a communication bus 314 (running from mPCI connector 114) across which signals/data are sent during the authentication process. Wireless module 111 comprises an ISM radio 112B, a U-NII radio 112A, and an EEPROM 317, in which is stored the identifying information for the radio. This information may be a parameter such as the PCI ID associated with the U-NII radio.

Computer system 100 comprises antenna 115 embedded in the lid portion and coupled via coax connector 113 to wireless module 111. Computer system 100 also comprises wireless LAN adapter 307, device driver API 309, and BIOS 133, which includes a table 311 of authorized U-NII antenna-radio pairings. In one embodiment, the U-NII antenna-radio parings in table 311 include all FCC approved pairings and the BIOS is created the same for all systems. In another embodiment, only those approved pairings with the antenna 115 embedded within the computer system placed within the table. This process creates a unique BIOS for each system.

During system design, the BIOS 133 is enhanced/extended with a mechanism to uniquely determine the antenna subsystem, which includes the antenna's size, shape, material, and tuning and the size, shape, and material of the surrounding composite. This provides a version of BIOS that is unique to the antenna and chassis only. Specifically, as illustrated, system BIOS 133 comprises the table 311 of authorized U-NII antenna-radio pairs for that device's chassis and antenna, which are utilized during the authentication process, as described further below. Specifically, the table 311 includes a listing of the approved Peripheral Component Interconnect (PCI) IDs for corresponding radio and antenna combinations that have been granted FCC authorization for operation.

Additionally, computer system comprises a Client Manager 303, such as IBM's Access Connections®. Client Manager 303 manages the type of wireless connection and provides a software key 304 required for enabling the dynamic switching to U-NII operation. Client Manager 303 communicates with the device driver API 309 and BIOS 133 to initiate and control the authentication procedure as described in detail below. In order to complete the authentication procedure, Client Manager 303 also comprises a comparator function (not shown). The combinations of relevance to the implementation depends on the manufacture-established parameters of the antenna and chassis, and thus, in one embodiment, the approved combination list may be limited to only those radios that are approved for use with the particular antenna of the system and within the particular system.

Figure 3B:
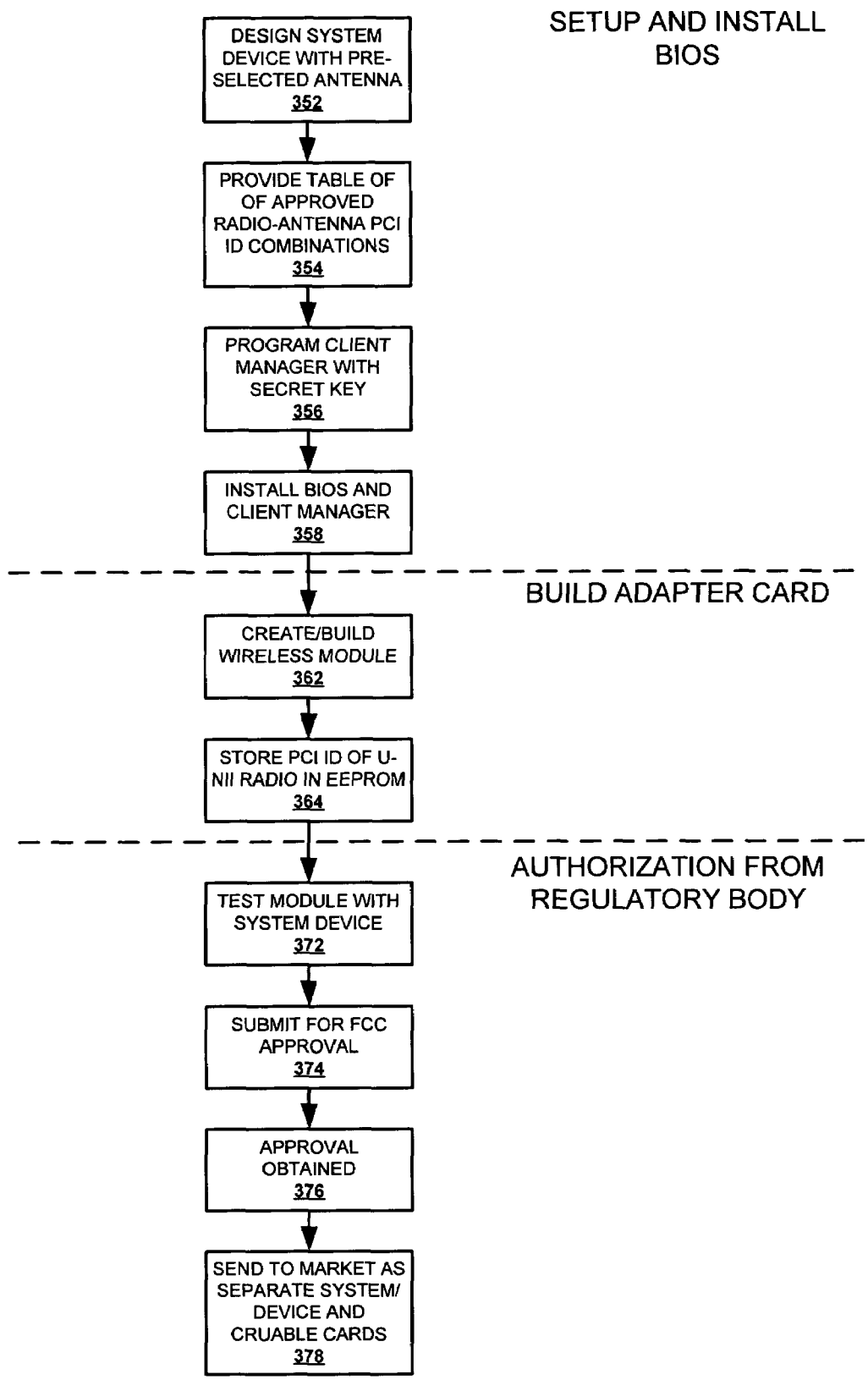
FIG. 3B is a flow chart illustrating the processes by which the device hardware and BIOS, etc. illustrated in the above figures are produced and authenticated for operation according to the one embodiment of the invention.

In order to support/provide the features of the invention, the above system components and radio module are designed and/or programmed with specific parameters and functionality. FIG. 3B provides a flow chart of the steps involved in obtaining FCC approval for the components after designing and/or programming the components with parameters and functionality required for implementing the steps of the invention. The process may be divided into three stages, which are: (1) designing, configuring, and installation of the BIOS and Client Manager; (2) building the CRUable adapter card; and (3) obtaining authorization from the regulatory body. Although described as sequential stages, the stages may be completed out of the described order or in an overlapping manner.

The first stage begins with a manufacturer designing the system/device with a particular antenna both having pre-established operating parameters as shown at block 352. That is, in additional to the operating parameters of the antenna, other parameters related to the chassis of the device are also specified within the system design. The BIOS creator then generates and stores the table of approved radio-antenna PCI ID combinations for that chassis, as shown at block 354. The manufacturer/supplier receives the authorized pairings from the FCC either before or during the FCC authorization process based primarily on the antenna parameters. The manufacturer also programs the Client Manager with a secret key that identifies the antenna-radio pair that is authorized for utilization in the device as indicated at block 356. Following, the BIOS and Client Manager are installed on the system/device/machine during completion of the building of the motherboard as indicated at block 358. An assumption is made that the manufacturer has loaded the correct BIOS and Client Manager based on the unique antenna type and device's chassis. This assumption is almost certain to be correct since failure of the manufacturer to provide the correct BIOS and Client Manager would result in unauthorized transmitters, leading to substantial financial and other penalties placed on the manufacturer by the FCC.

Once the system/device has been designed with the BIOS and Client Manager programmed with the necessary functionality based on the antenna-system/device combination, the second stage of creating/building the dual mode wireless radio module is completed as shown at block 362. During the build process, logic is provided within the module to complete device-to-module authentication steps, etc., when the module is inserted within the system/device and power is supplied to the module. Following, the manufacturer or authorized supplier configures the module by programming the PCI ID of the U-NII radio in the EEPROM of the module, as shown at block 364. Because different types of CRUable radios may be utilized within the system/device depending on the approved/authorized combinations, all CRUable U-NII radios designed for utilization with the particular system/device's chassis may be programmed with a same PCI ID. This eliminates the need for providing multiple PCI IDs that are each capable of receiving authorization during the authorization process. However, as will be explained later, only the correct model of radio is activated within the device. The secret key or other identifying characteristic of the authorized radio is imprinted in the EEPROM as indicated at step 366.

When a system/device and authorized module have been created, the combination is subjected to a series of tests as shown at block 372 to ensure the system/device complies with government regulations. Following the completion of these tests, the system/device is submitted to the regulatory body for approval as indicated at block 374, and the manufacturer waits for approval from the governing body. The cards are also tested and submitted for approval. Notably, manufacture of different cards and system/devices may also be submitted for approval from the government regulatory body. Government approval is thus obtained for all combinations of authorized radio module and system/device chassis and antenna, given the Client Manager-BIOS authentication operation. After approval is obtained, as indicted at block 376, similarly configured and designed systems/devices and modules are sent to market as individual units for customer purchase as shown at block 378. The authentication process that is built into the system/device and CRUable cards is triggered whenever the two units are coupled to each other and the system/device is powered up.

The functionality and operation of each of the components of FIG. 3A within the invention is described below with reference to the process flow of FIG. 4. To simplify the description of the process, only those components of FIG. 3A that are vital to an operation are indicated with a reference numeral in the following description of FIG. 4.

Figure 4:
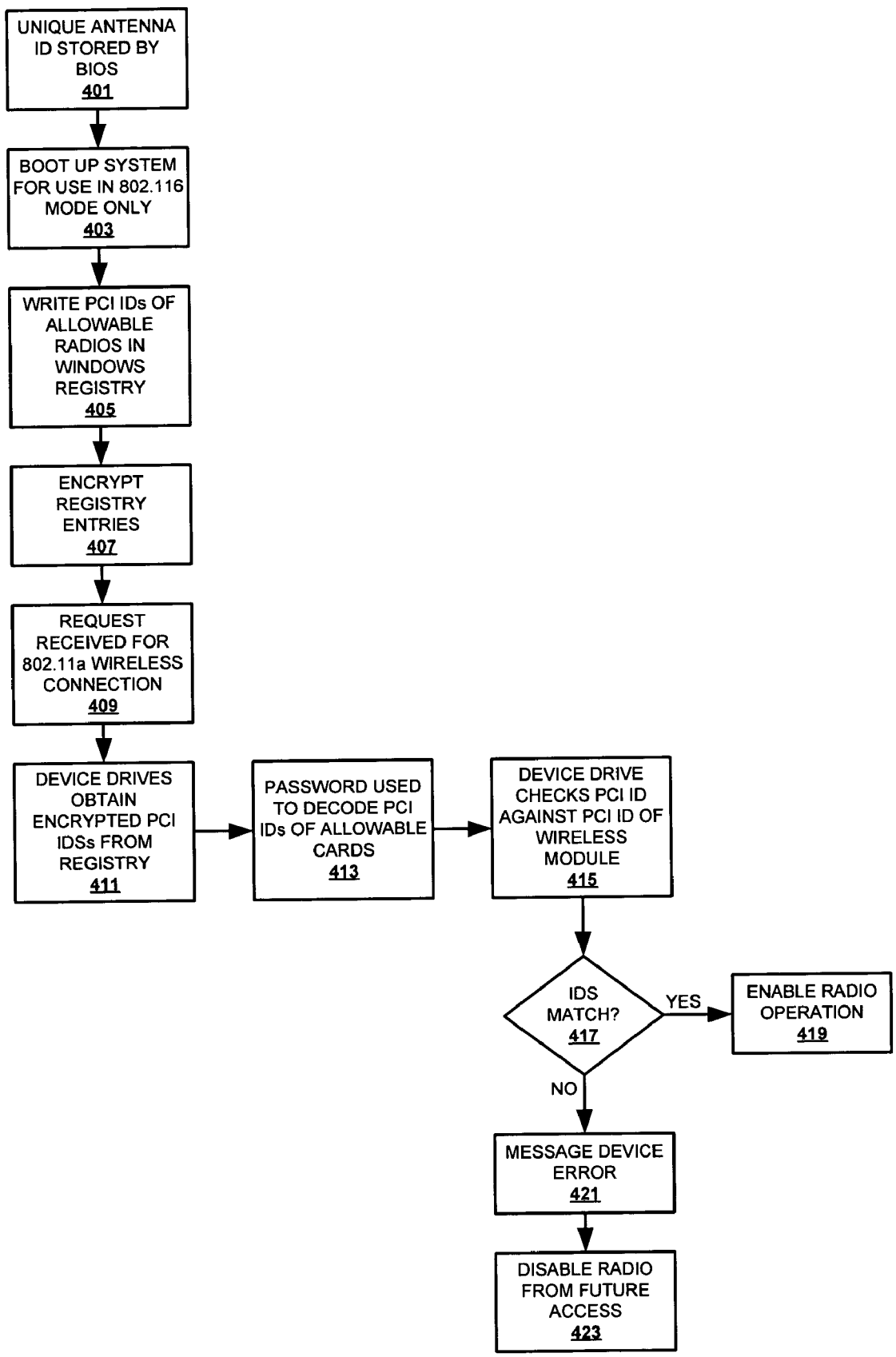
FIG. 4 is a flow chart of the process by which a Client Manager utility of FIG. 3A completes the authentication of the U-NII wireless radio within the dual mode wireless module in accordance with the first embodiment of the invention.

FIG. 4 illustrates the process of completing post-boot authentication of U-NII radios to enable U-NII communication within a computer system having a dual mode wireless card. The process begins at block 401 when the Client Manager receives a request for a wireless network connection (i.e., initially recognized only as a request for connection by one of the radios on the wireless module). The module and system/device defaults to ISM operation, which is utilized for most of the wireless communications requested. Client Manager makes a determination at block 403 whether the request is for an ISM connection. When the system is operating in ISM mode, Client Manager responds automatically to requests for ISM connection by activating the ISM radio to make the ISM connection utilizing the ISM radio/antenna pair as is indicated at block 405. Activation of the radio may be required because the radio may go into an inactive state when not being utilized.

However, when the request received by the Client Manager is for connection to a U-NII supported network (i.e., not a request for an ISM connection), the Client Manager does not automatically honor the request. Rather, as shown at block 407, Client Manager initiates a series of checks that includes comparing the combination of the antenna ID and the radio's (or wireless LAN card's) PCI ID against a list of approved antenna/radio ID pairs provided by the table stored within the BIOS. A determination is made at block 409 whether the combination of the radio's PCI ID and antenna's PCI ID match a pair within the table. When the combination of PCI IDs match a pair within the table, the Client Manager recognizes that the combination is an approved combination and enables the U-NII transmission as shown at block 413. Almost simultaneously, the Client Manager disables all ISM devices as indicated at block 415.

When the comparison of the ID pair does not match one in the table, the Client Manager messages the error and completely disables the U-NII radio as shown at block 411. Client Manager may permanently disable the device to save time of completing a later authentication when a request for an U-NII connection is next received. When in the permanently disabled state, the Client Manager does not need to check the ID pairing against ones in the table because the Client Manager knows the radio does not meet the FCC requirements. The Client Manager thus confirms that the wireless LAN card is installed in an authorized system and disables the U-NII radio of a dual mode wireless card when the FCC's integral coupling requirement for U-NII transmitters is not met.

Alternative embodiments of the above-described implementation provide other methods of completing the confirmation rather than the method of block 407. For example, in one embodiment, rather than placing the table within the BIOS, a table or an algorithm of valid antenna IDs and PCI IDs that have been granted FCC authorization for operation is provided within the Client Manager. For each antenna PCI ID (i.e., unique antenna subsystem), a determination is made about which mPCI cards tracked by PCI IDs (system and subsystem) have received regulatory approval. If the Client Manager software determines that the combination of computer system/antenna and wireless LAN card is legal for U-NII operation, the Client Manager software generates and sends a command (i.e., secret key 304) to the device driver 309. The command triggers the device driver 309 to change to U-NII mode and disable ISM mode.

The Device Driver decodes the command received from the Client Manager's API (application program interface). In this embodiment, the Device Driver is provided knowledge of the key utilized to decode the command. If the card is installed in an unauthorized system, the Device Driver blocks any switching from ISM mode to U-NII mode. If the card is installed in an authorized system, the ISM radio is disabled and the U-NII radio is enabled. A mechanism to reverse-switch from U-NII mode to ISM mode is also provided within Client Manager.

There are several additional considerations with the above-described embodiments. These include: (1) The BIOS lock is utilized to ensure that the system will only boot with authorized (ISM) cards; (2) The Device Drivers are required to recognize that particular Client Manager, which determines which cards can be enabled; (3) The U-NII radio is disabled until enabled by the Device Driver; and (4) The Client Manager may be used in a single mode U-NII wireless LAN device.

Also, with the current embodiment, because the Client Manager first determines if the U-NII connection is authorized prior to allowing an U-NII connection, identical cards, such as Calexico cards, may be installed in various portable systems (e.g., ThinkPads). For machines with approved antenna-radio combinations, the Client Manager will enable roaming to U-NII-based networks.

In one embodiment, the wireless LAN card is disabled by default, and the Device Driver will not enable the card to for use with the antenna if the card is not installed in a system where the antenna paring with the radio is an FCC approved combination. This authorization check is completed during boot up and the device/card may be prevented from completing the boot up when the U-NII radio is unapproved for that system/device. However, as described above, (block 412), the computer system may be allowed to boot-up but with the wireless capabilities completely disabled. Further, other built-in checks of the invention may cause the computer system to automatically shut down if the user attempts to connect using an unauthorized radio (i.e., a radio that has not been authenticated by the above processes) during system operation. Additional safeguards are thus provided by the invention. For example, with the above described embodiment, only a single authentication is required before the device first goes into U-NII transmission mode and subsequent access is provided without further authentication. However, in another embodiment, later switching between ISM and U-NII mode still requiring a second or subsequent authentication, which may be a shortened form of the previous authentication since parameters have already been determined. The FCC's unique coupling requirement for integral transmitters is thus satisfied using software-implemented authentication of CRUable dual mode wireless modules within computer systems designed to support U-NII wireless transmissions.

Some additional considerations are required for the embodiment in which is the boot process completes on the system with the wireless LAN card inoperative for U-NII transmission capability. Among these considerations, an important one is that the Device Drivers that recognize the manufacturer's mPCI cards should include logic for the "Allowable Card ID." That is, the device driver is designed to only allow the inserted card to work (or become operational) in certain systems to which the cards match. Systems are thus designed with specific device drivers that look for pre-specified, unique cards and only accept those cards; and (3) The U-NII radio is disabled until enabled by the Device Driver.

(2) Validation Utility Implementation

The second, CRUable dual mode LAN card embodiment utilizes software means to meet the FCC requirement for the antenna to be an "integral part of the device". This second embodiment provides a novel use of system software BIOS, Device Driver, along with a Validation Utility. These components collectively complete an authentication of the U-NII radio and antenna pair to create an integral device while the computer system is operational.

Figure 5:
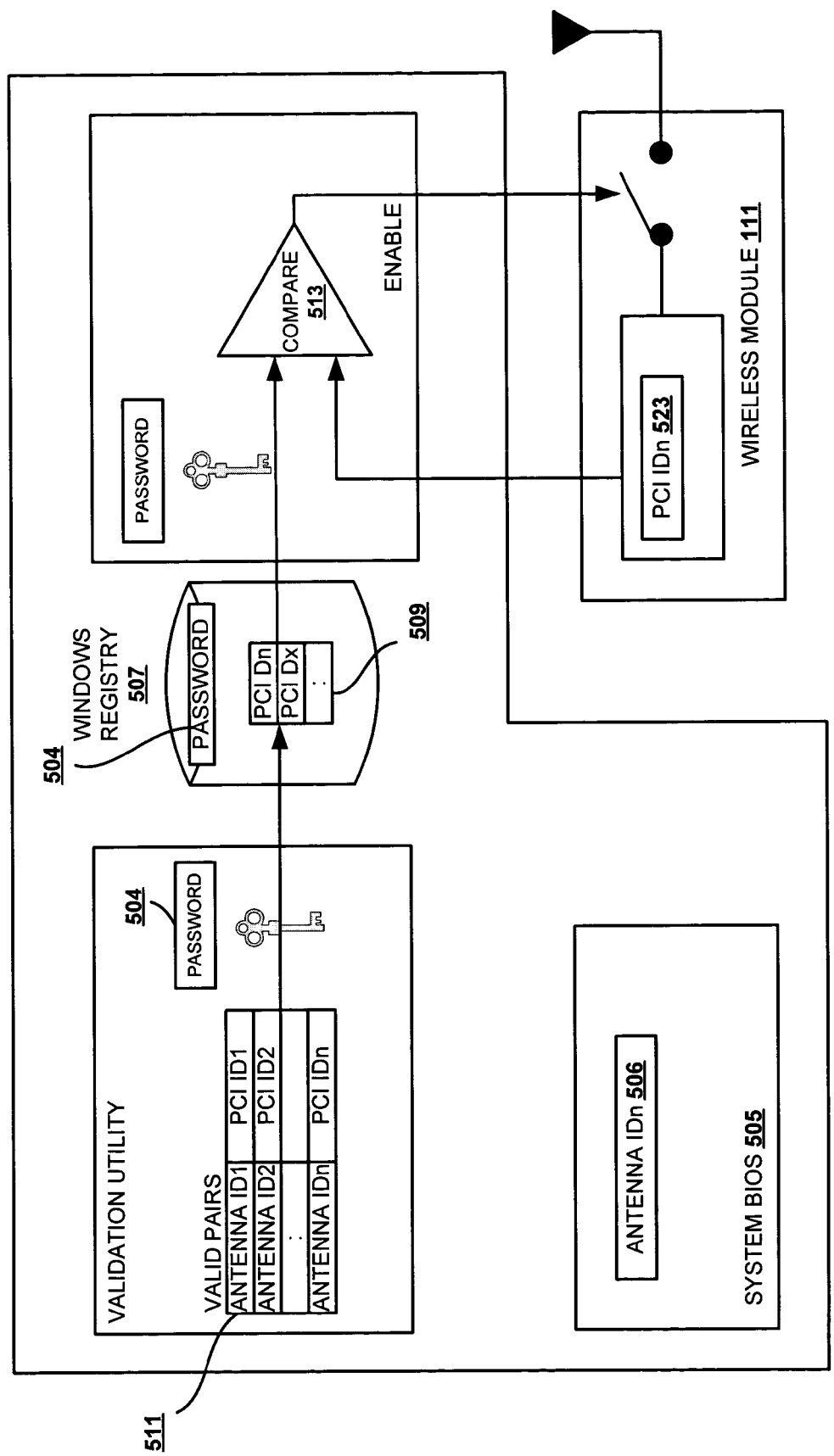
FIG. 5A depicts the components by which authentication of a U-NII radio within a dual mode wireless module is completed utilizing a Validation Utility and password registry according to a second embodiment of the invention.
FIG. 5B is a flow chart of the process by which the Validation Utility of FIG. 5A completes the authentication of a U-NII radio within a dual mode wireless module in accordance the second embodiment of the invention.
Figure 5A:
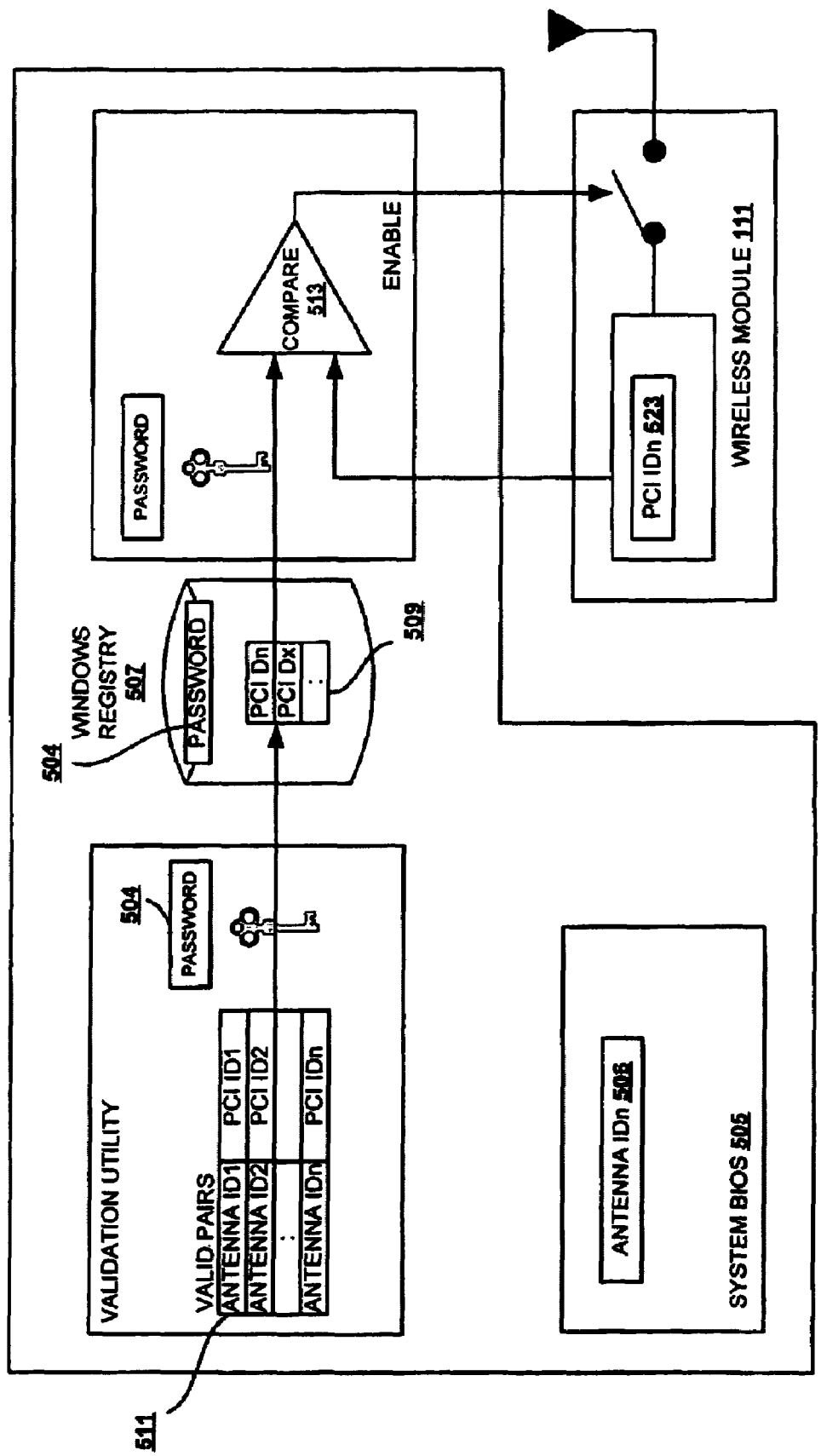

FIG. 5A illustrates the key components of the second implementation for authenticating of an U-NII-enabled device with a dual mode wireless LAN card that may be switch from ISM operation to U-NII operation, and vice versa. Again, the antenna is imbedded in the chassis and has a unique antenna ID, which is accessible either through system software via a BIOS call or from a known location in which the antenna ID is stored. Also, design and creation of the wireless system/device and CRUable card as well as the authorization of both are completed somewhat similarly to the process illustrated in FIG. 3B. However, rather then utilizing a Client Manager, the current system is designed with a Validation Utility and a Windows Registry.

As shown in FIG. 5A, computer system 100 comprises system BIOS 133, which includes a register 506 in which is stored a unique antenna ID 906. Computer system also comprises two additional components unique to this embodiment. These components are windows registry 507 and Validation Utility 501. Windows registry is a database of PCI IDs for authorized wireless LAN cards for the system/device 100. Validation Utility 501 is a special software program that is installed in the computer system and utilized to place PCI IDs of authorized wireless LAN cards in the Windows Registry 507. Thus, Validation Utility 501 comprises a table 511 (or algorithm) of valid combinations of antenna IDs and U-NII radio PCI IDs that have been granted FCC authorization. For each unique antenna ID, a check is made to determine which mPCI cards, tracked by their PCI IDs (both in the system and subsystem), have received regulatory approval. The table 511 in the Validation Utility 501 is updated whenever the manufacturer updates the Antenna-Radio Valid Pairs. Computer system 100 also comprises device driver 509, which includes compare logic 513 and a copy of the password key utilized in the implementation of the authorization features of the invention. Coupled to the computer system via connectors/interface is a dual mode wireless module 521, which has a PCI ID register 523 that stored the PCI ID of the wireless module (i.e., particularly the PCI ID of the U-NII radio).

Figure 5B:
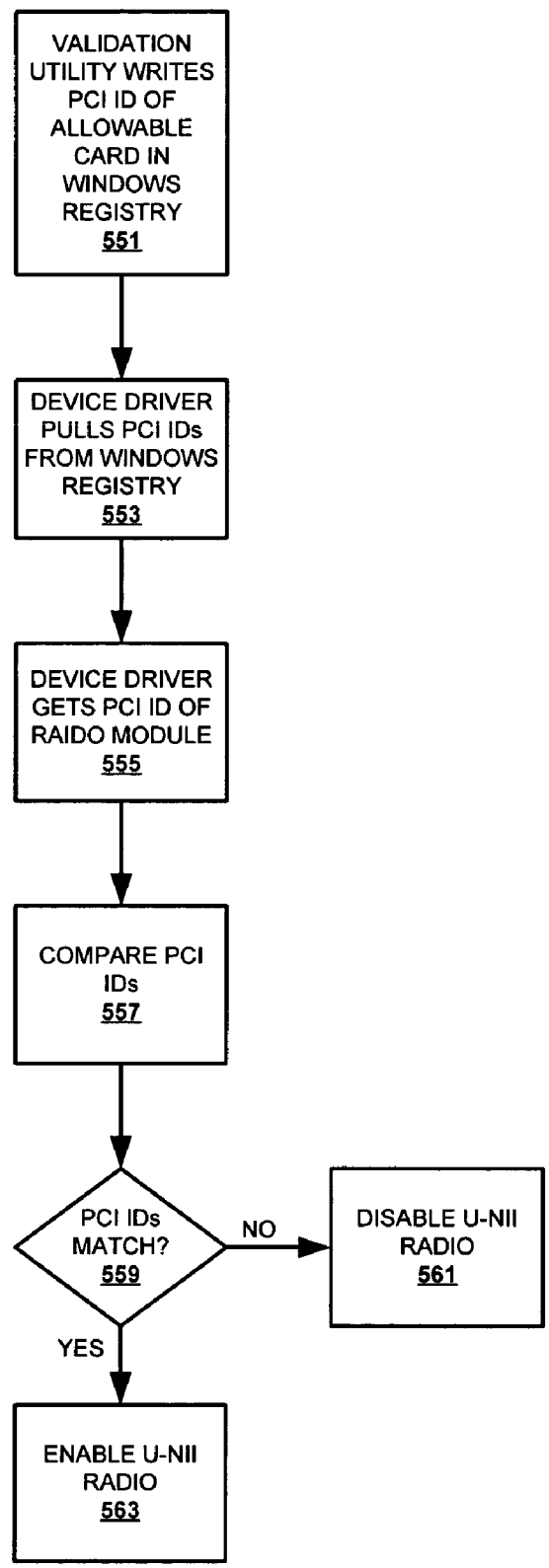

The actual process by which the authentication occurs is illustrated by FIG. 5B, which is described below with overlapping reference to the components of FIG. 5A. The process begins at block 601. Following the system boot up, the Validation Utility 501 writes the PCI IDs of the allowable wireless LAN cards (radios) in a specified location in the Windows Registry 507 as shown in block 551. The entries in the windows registry 507 are encrypted by the Validation Utility. The Validation Utility 501 is executed each time the system boots to ensure that the allowable card entries in the Windows Registry 507 are updated and accurate. This mechanism adds extra protection against the hard drive (HDD) being moved to another computer system with a different chassis and antenna. Thus, the problems of maintaining control over authorized antenna subsystem and radio combinations due to swapping of hard disk drives (HDD) between machines in a static configuration are eliminated.

The Device Driver 509 pulls the encrypted PCI IDs of the valid mPCI cards from the Windows registry 507 as shown at block 553. The Device Driver 509 is designed with decryption password 904 and is able to decode the encrypted PCI IDs of the allowable cards. The Device Driver 909 then checks the PCI ID of the installed wireless module (as depicted at block 555) and compares that PCI ID of the module (U-NII radio) with the decoded PCI IDs of allowable cards as shown at block 57. A determination is made at block 559 whether the two PCI IDs match. If the PCI IDs do no match, the wireless module/card is installed in an unauthorized system and the Device Driver disables the U-NII radio on the card as shown at block 561. However, if the PCI IDs match, the card is installed in an authorized system and the U-NII radio is enabled. The above authorization steps occurs at run time or each time the device driver loads and initializes. In some embodiments, a computer system may have approvals for more than one mPCI cards (i.e., an approval for a U-NII, another for dual mode Module, etc.). In these circumstances, the PCI ID of each approved card is provided and compared against the PCI ID of the inserted card.

Considerations for this embodiment include the following: (1) BIOS lock is used to ensure that the system will only boot with authorized cards; (2) the manufacturer requires that Device Drivers recognize that the manufacturer's mPCI cards must have logic for the "Allowable Card ID"; (3) the U-NII radio is disabled until enabled by the Device Driver; and (4) methods other than password protect can be used to protect the integrity of the registry information.

Overview

Current solutions for U-NII enabled systems utilize tamper proof screws to prevent the removal of the radio by unauthorized personnel. For PCMCIA (personal computer memory card international adapter) cards, the antenna is soldered to the radio and is a single unit, and this prevents un-intentional removal of the radio. The various implementations and/or embodiments of the present invention enables a manufacturer to offer wireless ready systems for dual mode U-NII (5 GHz band) purpose. Further the invention allows for after-market purchase of a radio that satisfied the FCC requirements, thus enabling users the flexibility of deciding whether to invest in the more expensive U-NII devices. The invention also results in significant cost savings to the manufacturer, since the U-NII products are CRUable, i.e., customers can install, exchange, or replace the radio, rather than requiring the radio to be serviced by an authorized service center. This solution also provides a significant improvement in manufacturing, since it does not require tamper proof designs.

While the invention has been described with specific reference to portable computers and/or laptop computers, the features of the invention are not limited to such devices. Those skilled in the art appreciate that the features of the invention may be extended to any device utilizing wireless transmitters, including desktop computers that are built with embedded antennas and a slot for receiving a wireless card, and any portable electronic device with similar wireless transmission capabilities and components.

Also, it is important to note that while the present invention has been described in the context of a fully functional data processing system, those skilled in the art will appreciate that the mechanism of the present invention is capable of being distributed in the form of a computer readable medium of instructions in a variety of forms, and that the present invention applies equally, regardless of the particular type of signal bearing media utilized to actually carry out the distribution. Examples of computer readable media include: nonvolatile, hard-coded type media such as Read Only Memories (ROMs) or Erasable, Electrically Programmable Read Only Memories (EEPROMs), recordable type media such as floppy disks, hard disk drives and CD-ROMs, and transmission type media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A method comprising:
receiving a CRUable dual mode wireless card having both an ISM radio and a U-NII radio in an interface within a wireless ready device designed for receiving a radio card, said U-NII radio having a radio identification (ID) parameter, wherein said interface enables said U-NII radio to be coupled to and send signals to an antenna that is embedded in the device and which has an antenna identification (ID) parameter;
prior to enabling use of said U-NII radio and said antenna to complete a U-NII transmission, completing an authentication process that verifies that said U-NII radio is an authorized radio for utilization with the antenna and within the device under U-NII standards; and
when said authentication process verifies that a pairing of said radio and said antenna is authorized, dynamically switching a transmission mode of said device from ISM mode to U-NII mode, which mode enables U-NII communication via said pairing of said antenna and said radio, wherein only a U-NII transmitter meeting an FCC "integral" requirement is enabled within the wireless-ready device having the embedded antenna, and wherein U-NII communication is not enabled if said authentication process does not verify that said pairing is authorized.

2. The meted of claim 1 wherein;
said CRUable dual mode wireless card also comprises storage means for holding the radio ID and interface connection pins for connecting said card to said interface of said device, wherein said interface connection pins include a first pin for connecting each of said radios to the antenna and a second pin for connecting said card to a basic input/output system (BIOS) of the device; and
said step for completing an authentication process completes a radio-to-antenna and a radio-to-device authentication process, wherein only an authorized radio model is enabled within the device.

3. The method of claim 2, further comprising:
activating the ISM radio at power-on to provide default wireless transmission via ISM mode;
responsive to any request for transmission that does not specify U-NII mode, completing the transmission via ISM mode; and
automatically disabling the ISM radio whenever a request for U-NII mode transmission is received and the authentication process indicates the pairing of to U-NII radio and the antenna is authorized within the device, wherein only exclusive operation in ISM mode or U-NII mode is permitted within said device.

4. The method of claim 2, further comprising:
allowing a boot process being executed on the device to complete, wherein when said radio ID and the radio ID from the table does not match, said radio is disabled from operating within said device and said device is booted without U-NII transmission capability.

5. The method of claim 2, wherein said enabling step further comprises:
storing an indication of said match of radio IDs within an approval flag;
checking said approval flag for said indication prior to completing a U-NII connection from said device, wherein a request for U-NII connection is allowed to proceed only when said approval flag indicates that U-NII connection is authorized and other built-in checks are satisfied, and
clearing said approval flag whenever a triggering condition is registered on the device, said triggering condition being a condition form among rebooting the device, removing the wireless module, breaking a connection between said antenna and said radio, modification/replacement of said radio, modification/replacement of said antenna.

6. The method of claim 1, wherein said radio ID and said antenna ID are peripheral component interconnect (PCI) identifications (IDs).

7. The method of claim 1, said authentication process further comprising:
following a power on of said device, initiating a BIOS check of system components, wherein the radio ID is read from the U-NII radio that is also electrically coupled to said BIOS;
populating a table with authorized antenna-radio ID pairs for that device;
retrieving the antenna ID from a storage location within said BIOS;
locating the antenna ID in the table of approved radio-antenna pairs;
reading an associated tabled radio ID from the approved radio-antenna pairs with the antenna ID of the embedded antenna;

comparing said radio ID of the U-NII radio against the tabled radio ID for a match of radio IDs.

8. The method of claim 1, further comprising:
following a determination that the radio ID of the U-NII radio matches one associated with the antenna ID, providing a secret key to a device driver to bigger the device driver to activate a switch of transmission modes from ISM to U-NII mode, wherein said device driver operates as a gatekeeper to allow only authorized radios to operate within the device, and
wherein said U-NII mode is deactivated until a software key authenticates the card when the comparing step results in a match.

9. The method of claim 2, wherein further:
said device comprises the antenna, the interface, which includes a BIOS interface and an antenna interface, a coax coupling the antenna interface to said antenna, a Client Manager utility, and the BIOS, which includes a table of approved radio-antenna pairings for the device.

10. The method of claim 9, wherein said reading and comparing steps are completed by the client manager utility, which provides a software key required to enable dynamic switching from ISM to U-NII transmission modes, said method further comprising:
providing a table of authorized pairings of radio ID and antenna IDs within a client manager utility;
initiating the comparing step; and
signaling a device driver of the device when to enable an interface, which interface is required to provide wireless transmission in U-NII mode.

11. The method of claim 2, wherein further:
said device comprises the antenna, the interface, which includes a BIOS interface and an antenna interface, a coax coupling the antenna interface to said antenna, to BIOS, a device driver, a Validation Utility and a Windows register, which respectively provide a table of approved U-NII radio-antenna pairings and a table of approved wireless card IDs for the specific device.

12. The method of claim 11, wherein said reading and comparing steps are completed by the validation utility, said method further comprising:
providing a table of authorized pairings of radio ID and antenna IDs within the validation utility;
populating the windows registry with a list of approved cards for that device; and
following a determination tat the radio ID of the U-NII radio matches one within the table, generate a secret key that is sent to the device driver to trigger the device driver to activate a switch of transmission modes from ISM to U-NII mode, wherein said device driver operates as a gatekeeper to allow only authorized radios to operate within the device.

13. The method of claim 11, further comprising signaling the device driver of the device when to enable an interface, which interface is required to provide wireless transmission in U-NII mode, Wherein correct software key is required to enable the device driver to dynamically switch from ISM to U-NII transmission modes.

14. The method of claim 11, said authentication process further comprising:
retrieving a secret key from a device driver, said secret key being an allowable card ID for that device;
comparing said secret key against the card's ID; and
enabling said radio to operate within said device only when said secret key matches the card ID, wherein U-NII transmission via the radio-antenna combination is enabled only when said radio-antenna ID pairing matches one of said approved radio/antenna ID pairs within the table and said secret key matches the ID of the connected radio card.

15. The method of claim 11, wherein said secret key is a model number of approved cards for operation within the device and said model number is associated with the radio PCI ID in within the table.

16. The method of claim 11, wherein said device is a wireless-ready computer system and said method enables heterogeneous roaming from one transmission mode to another from the wireless ready computer system utilizing approved transmitters.

17. A wireless-ready device comprising:
an embedded antenna having an antenna ID and specific design characteristics to enable ISM transmission when coupled to an ISM radio and U-NII transmission when coupled to an authorized U-NII radio;
an interface which receives a CRUable dual mode wireless card with an ISM radio and a U-NII radio having a radio ID, wherein said interface enables said U-NII radio to be coupled to and interface with the embedded antenna;
a BIOS that is linked to both the antenna and the U-NII radio and is able to acquire the radio ID and the antenna ID;
an authentication mechanism associated with said BIOS that initiates a radio-to-device verification process following a boot of the device, wherein said authentication mechanism verifies that said radio is an authorized radio for utilization with the embedded antenna and that said radio card is authorized to operated within said device according to pit-established U-NII standards; and
a device driver having U-NII transmitter activation logic tat, when said verification process verifies that said radio is authorized for utilization with said antenna and said card is authorized for utilization within said device, enables U-NII transmission mode utilizing the antenna and U-NII radio combination, wherein only a U-NII transmitter meeting an FCC "integral" requirement is provided enabled within the wireless ready device, and wherein U-NII communication is not enabled if said verification process does not verify that said radio is authorized.

18. The device of claim 17, wherein:
said CRUable dual mode wireless card also comprises storage means for holding the radio ID and interface connection pins for connecting to said interface of said device, wherein said interface connection pins include a first pin for connecting said U-NII radio to the antenna and a second pin for connecting said card to a basic input/output system (BIOS) of the device.

19. The device of claim 18, said device driver further comprising:
logic for activating the ISM radio at power-on to provide default wireless transmission via ISM mode;
logic, responsive to any request for transmission that does not specify U-NII mode, for completing the transmission via ISM mode; and
logic for automatically disabling the ISM radio whenever a request for U-NII mode transmission is received and to authentication process indicates to pairing of the U-NII radio and the antenna is authorized within to device, wherein only exclusive operation in ISM mode or U-NII mode is permitted within said device.

20. The device of claim 17, said authentication mechanism comprising:

activation code, which initiates a BIOS check of system components following a power on of said device, wherein the radio ID is read from the U-NII radio that is also coupled to said BIOS and the antenna ID is retrieved from a storage location for the antenna ID;

authentication code that (1) populates the table within the device with authorized antenna-radio ID pairs for that device; and (2) reads a tabled radio ID that is associated with an antenna ID within the table that is the same as the antenna ID of the embedded antenna;

a comparator that compares the radio ID with the tabled radio ID following a matching of the antenna ID with one within the table; and a verification mechanism that, when said radio ID and said tabled radio ID matches, signals an approval of said radio-to-device authentication as a successful authentication of said radio for operation within said device.

21. The device of claim 18, wherein:

said authentication mechanism further comprises logic that in response to a match of the radio ID with the tabled radio ID, provides a secret key to the device driver; and said device driver comprises logic that, when said secret key is received, compares the secret key to a card ID of the wireless card and activates a switch of transmission modes from ISM to U-NII mode only when said secret key matches the card ID, wherein said device driver operates as a gatekeeper to allow only authorized radio cards to operate within the device.

22. The device of claim 18, wherein further:

said device driver includes logic for enabling said radio to operate within said device only when said secret key matches the card ID, wherein U-NII transmission via the radio-antenna combination is enabled only when said radio-antenna ID pairing matches one of said approved radio/antenna ID pairs within the table and said secret key matches the ID of the connected radio card.

23. The device of claim 18, further comprising:

boot termination mechanism that allows a boot process being executed on the device to complete when said radio 113 and said tabled radio ID matches, wherein when said match does not occur, said boot termination mechanism terminates said boot process.

24. The device of claim 18, further comprising:

a transmission disabling mechanism that disables said radio from operating within said device when said radio ID and said tabled radio ID do not match or said secret key does not match the card ID, wherein said device is initially booted without U-NII transmission capability.

25. The device of claim 18, wherein said device driver comprises a transmission disabling mechanism that disables said radio from operating within said device when said radio ID and said tabled radio 133 do not match or said secret key does not match said card ID, wherein said device is booted without U-NII transmission capability.

26. The device of claim 18, further comprising:

an approval flag that stores a result of the comparison of the radio IDs;

means for checking said approval flag for said result prior to completing a U-NII connection wit said device, wherein a request for U-NII connection is allowed to proceed only when said result indicates a match between said radio IDs; and a reset mechanism for resetting a value of said validation register whenever a triggering condition is registered on the device, said triggering condition being a condition from among rebooting the device, removing the wireless module, breaking a connection between said antenna and said radio, modification/replacement of said radio, modification/replacement of said antenna.

27. The device of claim 17, wherein further:

said authentication mechanism is a Client Manager utility; and said device comprises the antenna, the interface, which includes a BIOS interface and an antenna interface, a coax coupling the antenna interface to said antenna, the Client Manager utility, and the BIOS, which includes a table of approved pairings of radio and antenna IDs for the device.

28. The device of claim 18, wherein further:

said authentication mechanism includes a Validation utility and a Windows register, which respectively provides a table of approved U-NII radio-antenna pairings and a table of approved wireless card IDs for the specific device; and said device comprises the antenna, the interface, which comprises a BIOS interface and an antenna interface, a coax coupling the antenna interface to said antenna, the BIOS, a device driver, the Validation Utility and the Windows register.

29. The device of claim 28, said authentication mechanism further comprising logic for completing the steps of:

following a power on of said device, initiating a BIOS check of system components, wherein the radio ID is read from the U-NII radio that is also coupled to said BIOS;

populating the table within the validation utility wit the authorized pairings of antenna and radio IDs for that device;

retrieving the antenna ID from a storage location within said BIOS;

reading a first radio ID from the table within the BIOS, wherein said radio PCI ID read is one stored as a paired entry in said table with the retrieved antenna ID of the embedded antenna;

comparing a pairing of said radio 113 and said antenna ID against the table of approved radio/antenna ID pairs, wherein the radio IDs are compared once the retrieved antenna ID is located within the table.

30. The device of claim 29, wherein said logic for completing the reading and comparing steps comprises the validation utility, which provides the device driver with a software key required to enable dynamic switching from ISM to U-NII transmission modes, said logic further comprising logic for completing the steps of:

providing a table of authorized pairings of radio ID and antenna IDs within the validation utility;

initiating the comparing step; and signaling a device driver of the device when to enable an interface, which interface is required to provide wireless transmission in U-NII mode.

31. The device of claim 29 further comprising logic for completing the steps of:

populating the windows registry with a list of approved cards for that device; and following a determination that the radio ID of the U-NII radio matches one within the table, generate a secret key that is sent to the device driver to trigger the device driver to check the list of approved cards within the windows registry against the card ID of the wireless card, wherein said device driver activates a switch of transmission modes from ISM to U-NII mode only when said card ID matches one within the windows registry, and wherein said device driver operates as a gatekeeper to allow only authorized radio cards to operate within the device.

* * * * *